3,563,921
ION-EXCHANGE MEMBRANES
Guy Bourat, Bourg-la-Reine, France, assignor to Rhone-Poulenc S.A., Paris, France, a French body corporate
No Drawing. Filed Sept. 24, 1968, Ser. No. 762,136
Claims priority, application France, Sept. 25, 1967, 122,152
Int. Cl. C08g 29/24
U.S. Cl. 260—2.1                                                   10 Claims

ABSTRACT OF THE DISCLOSURE

Ion-exchange membranes of good mechanical properties are made from films of a vinyl chloride polymer or copolymer, either grafted with an aromatic vinyl monomer containing a tertiary nitrogen atom or mixed with a polymer of such a monomer, quaternised with an alkyl or aralkyl dihalide.

---

The present invention relates to ion-exchange membranes formed of a vinyl chloride polymer or copolymer.

It has been proposed to prepare ion-exchange membranes by dispersing particles of an ion-exchange material in a polymer binder. These membranes, called heterogeneous membranes, have numerous disadvantages which arise from their structure. It is in fact difficult for the ion-exchange material to be dispersed uniformly in the polymer binder. The consequence of this is to create, in the membrane, zones with a high concentration of ion-exchange groups and zones with a low concentration of these same groups, and this leads to inequalities in the ion absorption when the membrane is employed, and these inequalities lead to serious strains and tensions. In addition, the electrical conductivity of these membranes is relatively low.

In order to obviate these disadvantages, it has been proposed to manufacture homogeneous ion-exchange membranes in which the ion-exchange groups are carried by the film-forming polymer itself. This object has been achieved by polymerising or copolymerising a monomer carrying an ion-exchange group (for example, p-vinyl-benzene sulphonic acid) or a group capable of being transformed into an ion-exchange group by a known process (for example, p-chloromethyl-styrene). Generally, in order to impart adequate mechanical properties to the membrane, the monomers are used with a divinyl or polyvinyl monomer (e.g. divinyl-benzene) so as to create a three-dimensional bond lattice by crosslinking, as well as chains of the polymer forming the membrane. Because of their rigidity, these membranes also have internal tensions, particularly in the dry state, and this generally causes the material to crack or split.

It has been proposed (see U.S. Pat. No. 3,004,909) to prepare ion-exchange membranes by casting homogeneous solutions (in a co-solvent) of a film-forming polymer or copolymer (e.g. a vinyl chloride/acrylonitrile copolymer) and a polyelectrolyte (for example, vinyl-benzene-trimethylammonium chloride polymer). However, the membrane is unsatisfactory, because the polyelectrolyte is not bonded to the film-forming polymer, and can be extracted progressively from the membrane while it is in use.

It has now been found, and it is this which forms the subject of the present invention, that ion-exchange membranes having excellent mechanical properties and high flexibility and from which the polyelectrolyte cannot be extracted, can be made of a vinyl chloride polymer or copolymer grafted with an aromatic vinyl monomer comprising an intranuclear or juxtanuclear tertiary nitrogen atom, or of a polymer or copolymer of vinyl chloride and a polymer of an aromatic vinyl monomer comprising one intranuclear or juxtanuclear tertiary nitrogen atom, all or part of the said tertiary nitrogen atoms having been quaternised by an alkyl or aralkyl dihalide, and optionally in addition with a mono-quaternising agent. Preferably, these new membranes are made by casting a solution of the graft copolymer or polymer mixture containing tertiary nitrogen atoms, and treating the film obtained with the alkyl or aralkyl dihalide, and optionally also the mono-quaternising agent.

In the membrane obtained, the alkyl or aralkyl dihalide imparts to the polymer a three-dimensional structure which is sufficient to ensure that the polyelectrolyte is insoluble in water, without however causing the membrane to lose its flexibility.

The vinyl chloride polymer or copolymer can be obtained by the usual polymerisation procedures. One particularly preferred class of vinyl polymers and copolymers is that formed by polymerisation at low temperature, i.e. at below 20° C., like the polymers described in French Pat. No. 1,320,834. When a vinyl chloride copolymer is used, it preferably comprises a preponderant proportion of vinyl chloride and preferably a molar proportion of at least 80% of vinyl chloride. The comonomer associated with the vinyl chloride is preferably vinylidene chloride or acrylonitrile. Although it is possible to use vinyl chloride polymers and copolymers of a wide range of molecular weights, the mechanical properties of the resulting membranes and their resistance to alkaline media are better if polymers of high molecular weight are used. Average molecular weights from 80,000 to 300,000, preferably from 150,000 to 260,000, are particularly suitable.

Suitable aromatic vinyl monomers comprising an intranuclear tertiary nitrogen atom are the vinyl-pyridines (e.g. 2-vinylpyridine and 4-vinylpyridine) and the alkyl-vinyl-pyridines (e.g. 2-vinyl-5-methylpyridine). Suitable aromatic vinyl monomers with juxtanuclear nitrogen atoms are the N,N-dialkylamino-styrenes, preferably p-(N,N-dimethylamino)styrene.

When a graft copolymer of vinyl chloride and a nitrogeneous aromatic vinyl monomer is used as the film-forming material, the content of the nitrogeneous monomer in the copolymer can vary within wide limits. Thus, the copolymer can contain from 20% to 80% by weight of vinyl chloride and from 80% to 20% (preferably from 40% to 60%) by weight of the nitrogeneous aromatic vinyl monomer. One preferred type of graft copolymer is that resulting from the graft of a vinylpyridine onto a vinyl chloride polymer or copolymer by known means. It is thus possible to employ graft copolymers obtained by chemical grafting with a compound which generates free radicals, such as an organic peroxide or azo-bis-isobutyronitrile incorporated in the stock polymer, or by radiochemical grafting resulting from the contact of the stock polymer (subjected beforehand to the action of ionising radiation) with a vinylpyridine.

When a mixture of a vinyl chloride polymer or copolymer and a polymer of the nitrogeneous aromatic vinyl monomer is used for the manufacture of the membrane, the proportion of each of the constituents of the mixture can also vary within wide limits. Thus, the proportion of polymer derived from the nitrogeneous aromatic vinyl monomer can be from 20% to 80% by weight, preferably from 40% to 60% by weight, of the mixture.

The membranes of the invention can be obtained by the usual processes of casting solutions of the graft polymer or of the mixture of polymers in miscible common solvents. Suitable such solvents are pyridine, dimethyl-formamide, dimethylacetamide, dimethylsulphoxide, tetrahydrofuran, cyclohexanone, and γ-butyrolactone.

Instead of forming the membrane by casting a film onto a support, it can be produced by soaking a woven or unwoven fabric of natural fibres (cotton) or synthetic fibres (polyamides, polyesters) in a solution of the graft copolymer or of the mixture of polymers. Reinforced membranes having excellent mechanical properties and in particular an excellent resistance to tearing are then obtained.

The solutions of vinyl chloride polymer and of the nitrogenous aromatic vinyl polymer are generally prepared by dissolving each of the polymers in a common solvent. In the case of polymers of N,N-dialkylaminostyrenes, the solution can also be obtained by dissolving the vinyl chloride polymer or copolymer in an organic solution of the N,N-dialkylaminostyrene, followed by heat polymerisation of the latter.

The membrane obtained is then treated with an alkyl or aralkyl dihalide, preferably an alkylene or alkenylene dichloride or dibromide of 3 to 10 carbon atoms or a xylylene dichloride or dibromide, such as 1,3-dichloropropane, 1,4-dichlorobutane, 1,3-dibromopropane, 1,4-dibromobutane, 1,4 - dichlorobut-2-ene, bis-1,4-(chloromethyl) benzene(p - xylylene dichloride), or bis - 1,4 - (bromoethyl)benzene. Although the treatment of the membrane with the alkyl or aralkyl dihalide can be carried out in such a way as to ensure a total quaternisation of the tertiary nitrogen atoms, it is preferable to effect only a partial quaternisation with the diquaternising agent, and to complete the quaternisation with a monofunctional quaternising agent, such as an alkyl or aralkyl halide or sulphate; e.g. methyl, ethyl, or n-propyl, chloride, iodide or bromide, dimethyl or diethyl sulphate, or benzyl or cyclohexyl chloride, iodide or bromide. One preferred class of monofunctional quaternising agents is formed by the alkyl, cycloalkyl and aralkyl halides and sulphates in which the alkyl radical has a number of carbon atoms at least equal to 6. Dodecyl chloride, hexadecyl chloride and p-dodecyl-benzyl chloride are particularly suitable. These quaternising agents have a plasticizing effect on the material of which the membrane is composed and thus increase its flexibility. By regulating the degree of quaternisation by each of the quaternising agents, membranes can be obtained which present a wide range of mechanical and ion-exchange properties.

The treatment of the membrane with the quaternising agent is effected by simply soaking the membrane in a solution of enough of the quaternising agent to obtain the desired degree of quaternisation. Suitable solvents for the quaternising agent are solvents which exert a swelling action on the polymer or polymers forming the membrane. Methanol, benzene, acetone and their mixtures are particularly suitable. The conditions of this treatment and also the choice of the solvent can vary according to the nature of the polymer or polymers and of the quaternising agent or agents.

The following examples illustrate the invention.

EXAMPLE 1

5 g. of polyvinyl chloride with an AFNOR viscosity index of 420 cc./g. and with an average molecular weight of 240,000, obtained by polymerising vinyl chloride at a temperature of 2° C., and which contain 5% of lauroyl peroxide, are introduced into 700 cc. of a 2.5% aqueous solution of 4-vinylpyridine kept at 70° C. After being in contact for two hours, the polymer is separated by filtration, and washed while stirring for 48 hours in 500 cc. of methanol at 20° C. After drying, 10 g. of grafted polyvinyl chloride/4-vinylpyridine copolymer are obtained. The increase in weight is 100%.

The copolymer obtained is dissolved in 24 cc. of pyridine at 60° C. to produce a 5% solution of copolymer. 0.1 g. of p-dodecylbenzyl chloride is introduced into this solution with stirring. The solution is filtered under pressure and the filtrate is then degasified in vacuo.

By pouring the solution onto a glass sheet 20 x 20 cm., and drying at a temperature lower than 50° C., a flexible, transparent film is obtained which is easily stripped from the support and of which the thickness corresponds to a dry weight of 10 mg./cm.$^2$.

The film thus obtained is immersed in 200 cc. of a 2% by weight solution of p-xylene dichloride in methanol. After a contact period of 4 days, it is established that 12% of the nitrogen atoms present have been quaternised.

The film is then immersed in a 30% solution of p-dodecybenzyl chloride in acetone and the whole is brought to refluxing temperature of the acetone for 8 hours. It is found that a proportion of the nitrogen atoms, representing 10% of the nitrogen atoms of the film, has been quaternised. The film is then treated for 8 hours with a 10% solution of methyl iodide in methanol.

The film obtained in this way forms an ion-exchange membrane which contains 3% by weight of nitrogen and of which the substitution electric resistance is 1.1 ohm. cm.$^2$ in a 0.5 N aqueous potassium chloride solution.

EXAMPLE 2

A membrane having a thickness corresponding to a weight of 5 mg./cm.$^2$ is manufactured by working as in Example 1, but omitting the quaternisation with the p-dodecylbenzyl chloride. The substitution electric resistance of the membrane is 0.3 ohm. cm.$^2$.

EXAMPLE 3

A woven fabric of polyethylene glycol terephthalate, having a mesh size of 1 mm., is soaked in the solution of grafted polyvinyl chloride/4-vinylpyridine copolymer in pyridine and the fabric is then allowed to drip until it is no longer sticky. The fabric is again soaked in the pyridine solution and allowed to drip. The operation is repeated twice, allowing the suspended fabric to drip each time from a different edge. A supported film is obtained, which comprises 2.5 g. of dry copolymer per gram of fabric, on which are carried out the same quaternising operations as in Example 1. In this way, an ion-exchange membrane is obtained which has an improved resistance to tearing.

EXAMPLE 4

A solution of 5% by weight of polyvinyl chloride with an average molecular weight of 90,000 and 5% by weight of p-dimethylaminostyrene in cyclohexanone is prepared, filtered under pressure, and degasified in vacuo.

A film is prepared by pouring this solution on to a 20 cm. x 20 cm. glass sheet. It is allowed to dry for 2 hours at normal temperature and then the whole is placed in an oven at 70° C. for 12 hours. When the drying is completed, the film is separated from the glass support and immersed for 4 days at normal temperature in a 2% solution of p-xylylene dichloride in methanol. In this way, 50% of the nitrogen atoms contained in the film are quaternised. The said film is then soaked for 8 hours at normal temperature in a 10% solution of methyl iodide in methanol. In this way, a membrane is obtained which contains 2.5% by weight of nitrogen and of which the substitution electric resistance is 5 ohm. cm.$^2$ in a 0.5 N aqueous solution of potassium chloride for a thickness corresponding to a weight of 10 mg./cm.$^2$.

For a membrane of which the thickness corresponds to a weight of 3 mg./cm.$^2$, the substitution electric resistance is 0.6 ohm. cm.$^2$.

EXAMPLE 5

Poly-p-dimethylaminostyrene is prepared by adding a trace of iodine to 100 cc. of a 5% solution of p-dimethyl aminostyrene in dichloromethane, and the reaction mass is kept for 12 hours at ambient temperature in a nitrogen atmosphere. The dichloromethane is then removed under vacuum and the residue obtained is taken up in 150 cc. of boiling methanol. The solution is cooled and the poly-p-dimethylaminostyrene is isolated by filtration.

To prepare a film, polyvinyl chloride with an average molecular weight of 90,000 and the poly-p-dimethylaminostyrene previously obtained are successively dissolved in cyclohexanone so as to obtain a solution containing 5% by weight of each of the polymers. The solution obtained is homogenised by agitation, filtered under pressure and degasified. It is then poured on to the glass support used in the preceding examples and allowed to dry for 12 hours at ambient temperature. The film is separated from the support and immersed for 4 days at ambient temperature in a 2% solution of p-xylene dichloride in methanol. In this way, 50% of the nitrogen atoms contained in the film are quaternised. The film is then soaked for eight hours in a 10% methyl iodide solution in methanol, which is kept at ambient temperature. A membrane is obtained of which the substitution electric resistance is 3 ohm cm.$^2$, measured in a 0.5 N aqueous solution of potassium chloride, for a film of which the thickness corresponds to a weight of 10 mg./cm.$^2$.

For a film of which the thickness corresponds to a weight of 3 mg./cm.$^2$, the substitution electric resistance, measured under the same conditions, is 0.7 ohm cm.$^2$.

EXAMPLE 6

A cyclohexanone solution is prepared as in Example 5, but containing only 2.5% by weight of each of the polymers, and a membrane reinforced with a woven fabric of polyethylene glycol terephthalate is prepared as in Example 4.

EXAMPLE 7

An ion-exchange membrane is prepared as in Example 5, but from a cyclohexanone solution containing 3% of each of the two polymers, the polyvinyl chloride used in Example 5 being replaced by a polymer having an average molecular weight of 240,000. The membrane which is obtained has a resistance to tearing better than that of the membrane obtained in Example 5, and it has a substitution electric resistance of 3 ohm cm.$^2$. Its permeability, measured between two aqueous solutions of potassium chloride of respectively 0.8 M and 0.4 M, is 93%.

I claim:
1. An ion-exchange membrane formed of a mixture of 20–80 percent by weight of a vinyl chloride polymer and 80–20 percent by weight of a polymer of a nitrogen containing aromatic vinyl monomer containing an intranuclear or a juxtanuclear tertiary nitrogen atom, said nitrogen containing aromatic vinyl monomer being a vinylpyridine or a N,N-dialkylaminostyrene, at least a portion of the tertiary nitrogen atoms having been quaternised by an alkyl or aralkyl dihalide.

2. A membrane according to claim 1, in which the vinyl chloride polymer has been obtained by polymerisation at a temperature below 20° C.

3. A membrane according to claim 2, in which the vinyl chloride polymer has an average molecular weight from 80,000 to 300,000.

4. A membrane according to claim 3, in which the vinyl chloride polymer has an average molecular weight from 150,000 to 260,000.

5. A membrane according to claim 1, in which the said monomer is 4-vinylpyridine or p-dimethylaminostyrene.

6. A membrane according to claim 1, in which the aralkyl dihalide is p-di(chloromethyl)benzene.

7. A membrane according to claim 1, in which the quaternisation of the nitrogen atoms is completed with a mono-quaternising agent.

8. A membrane according to claim 7 in which the mono-quaternising agent is an alkyl, aralkyl or cyclohexyl monohalide or sulphate.

9. A membrane according to claim 8, in which the mono-quaternising agent has at least 6 carbon atoms.

10. A membrane according to claim 9 in which the mono-quaternising agent is dodecylbenzyl chloride.

References Cited

UNITED STATES PATENTS

| 2,837,496 | 6/1958 | Vandenberg | 260—45.5 |
| 3,247,133 | 4/1966 | Chen | 260—2.1 |
| 3,257,334 | 6/1966 | Chen et al. | 260—2.1 |

FOREIGN PATENTS

| 1,237,442 | 6/1960 | France. | |

HAROLD D. ANDERSON, Primary Examiner

M. GOLDSTEIN, Assistant Examiner

U.S. Cl. X.R.

117—201